Nov. 2, 1965  W. R. DAVIS  3,214,802
FASTENER
Filed April 9, 1963  3 Sheets-Sheet 1
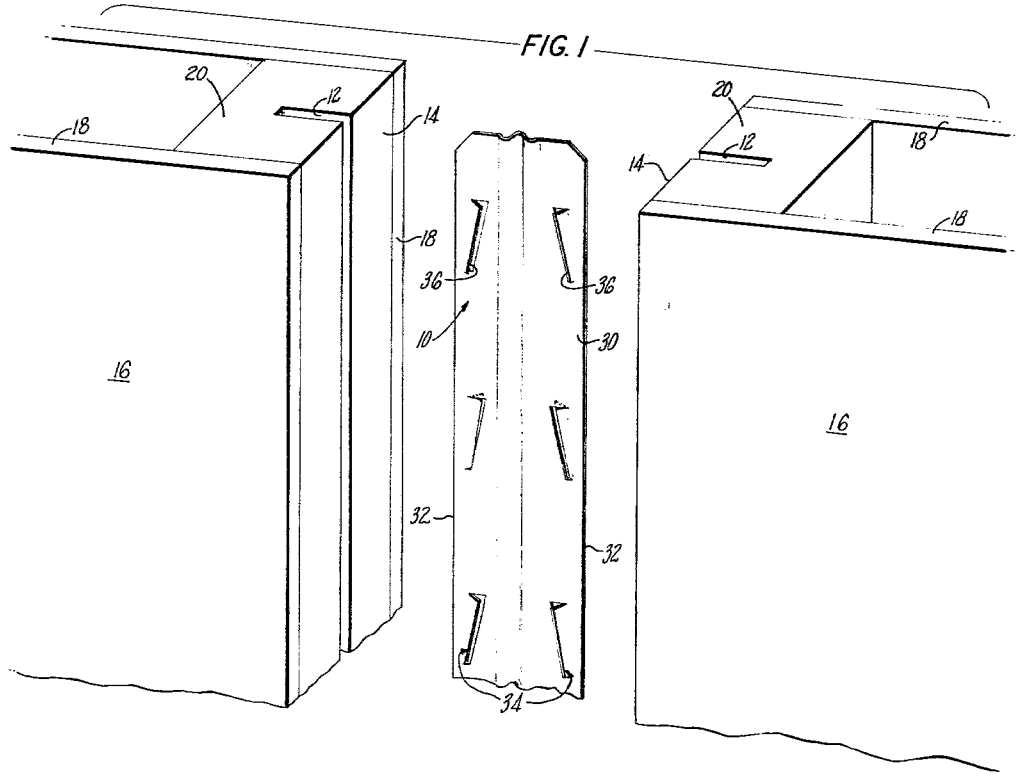
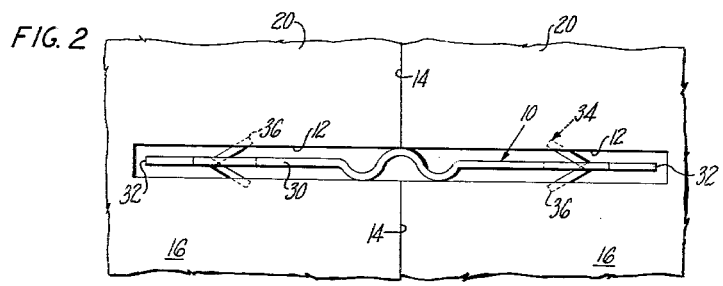
INVENTOR.
WILLIAM R. DAVIS
BY Lindsey, Prutzman and Hayes
ATTORNEYS Nov. 2, 1965  W. R. DAVIS  3,214,802
FASTENER Filed April 9, 1963  3 Sheets-Sheet 2

INVENTOR.
WILLIAM R. DAVIS
BY Lindsey, Deutzman and Hayes
ATTORNEYS

Nov. 2, 1965 W. R. DAVIS 3,214,802
FASTENER

Filed April 9, 1963 3 Sheets-Sheet 3

INVENTOR.
WILLIAM R. DAVIS
BY Lindsey, Prutzman and Hayes
ATTORNEYS

United States Patent Office 3,214,802
Patented Nov. 2, 1965

3,214,802
FASTENER
William R. Davis, West Simsbury, Conn., assignor to The Stanley Works, New Britain, Conn., a corporation of Connecticut
Filed Apr. 9, 1963, Ser. No. 271,650
7 Claims. (Cl. 20—92)

The present invention relates to fasteners and more particularly to improvements in fasteners adapted for joining contiguous members through the insertion of portions of the fastener into opposed slots formed in the members.

A principal aim of the present invention is to provide a new and improved fastener of the type described which is adapted for positively joining the slotted members into a rigid assembly and which is nevertheless adapted for retaining the slotted members in their joined relationship and for maintaining the strength of the joint even though there be some relative movement between the members as due to excessive loading on the joint or expansion and contraction of the members.

Another aim of the present invention is to provide a new and improved fastener of the type described which can be economically manufactured from a single sheet or a plurality of overlapping sheets of narrow sheet metal stock, as for example, steel strapping.

A further aim of the present invention is to provide a fastener of the type described that is adaptable for being manufactured from thin gauge sheet stock for joining members having slots or kerfs formed as by sawing, with a thickness greater than that of the sheet stock and which nevertheless provides substantially joint rigidity and maintains the joined members in proper alignment.

A further aim of the present invention is to provide a fastener of the type described adapted for facile insertion within the member kerfs and yet provide a strong joint having distribution of the loading thereon throughout its length.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is an isometric exploded view, partly broken away, of a panel joint incorporating a first embodiment of the fastener of the present invention;

FIG. 2 is an enlarged top plan view, partly broken away, of the joint of FIG. 1;

Figure 3:
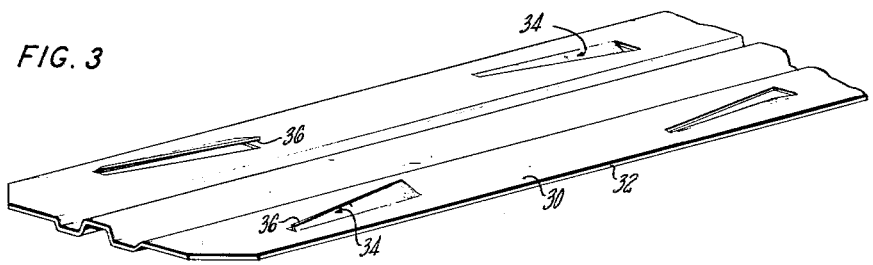
FIG. 3 is an isometric view, partly broken away, of a second embodiment of the fastener of the present invention.

Referring now to the drawings in detail, a resilient substantially flat fastener 10, preferably made of sheet stock spring steel, and hereinafter termed a spline, is adapted for insertion into a pair of opposed slots or kerfs 12 in the contiguous elongated surfaces 14 of two parts to be joined, here shown to be a pair of panels, generally denoted by the numerals 16, the joining of which by several embodiments of the fastener of the present invention is shown in FIGS. 2, 4, 6, 9 and 11. As shown in FIG. 1, the panels 16 have a pair of face members 18 of plywood, or the like, and elongated wooden edge members 20 affixed thereto for spacing the plywood and thereby increase the rigidity and strength of the panels. In the completed panel assembly, the elongated surfaces 14 are in abutting engagement with the elongated kerfs 12 extending in opposite directions for receiving the flat body 30 of the spline.

For reasons of economy in manufacture and handling, the spline 10 is preferably manufactured by a substantially continuous process, as from steel strapping. The embodiments shown in FIGS. 1, 3, 5, 8 and 10 are adapted for being so manufactured and comprise an elongated flat body 30 with parallel elongated edges 32 having a lateral spacing substantially equal to but less than the combined widths of the kerfs 12.

A plurality of longitudinally spaced pairs of teeth 34 are carried by the spline with teeth of each pair being symmetrically located on opposite sides of the lateral center line of the spline. The teeth are formed integrally with the spline body by cutting or slitting the body and deforming or bending a V-shape portion of the body outwardly to form tooth edges 36 offset from the spline body and extending at the same acute angle with the lateral center line of the spline. Selected teeth are offset on each side of the spline body for engagement with both sides of the kerf, there being shown in FIGS. 1, 3, 5, 8 and 10 a spline with pairs of teeth alternately offset from opposite sides of the spline body.

The spline may be assembled in the kerf 12 first laterally and then longitudinally, either by pulling or driving the spline with appropriate tools so that the tapered tooth edges 36 cut corresponding locking grooves in the edge members 20. The locking grooves cooperate with the spline teeth to bring the edge surfaces 14 of the panels into abutting engagement and to thereafter place the spline body 30 under tension.

In accordance with the present invention, economies in the manufacture of the spline and in the assembly thereof are accomplished concomitantly with an increase in the strength of the joint and the ability thereof to receive shock loads.

Figure 8:
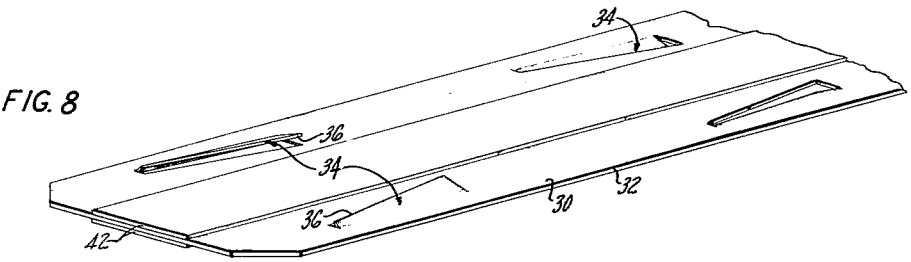
FIG. 8 is an isometric view, partly broken away, of a fourth embodiment of the fastener of the present invention.

In the usual joint of the type for which the fastener of the present invention has particular usefulness, the members 16 are wooden or of a woodlike material and the slots or kerfs 12 are formed by cutting the members as with a circular saw. The width of the kerfs 12 therefore have a width dependent upon the width of the saw blade. In accordance with the present invention, a thin gauge material having a thickness less than the width of the kerf may be used by deforming the central portion of the spline fastener as shown in the embodiments of FIGS. 1, 3, 5 and 10, or by increasing the width of the central portion of the spline fastener as shown in the embodiment of FIG. 8. The effective thickness of the central portion of the spline fastener is thereby increased to substantially equal the width of the kerf as shown in FIGS. 2, 4, 6, 9 and 11 and therefore adapted to prevent lateral play of the spline within the kerf.

The central portion of the spline is enlarged so as to form lands offset from both sides of the significant plane of the spline body 30 thereby positioning the lateral end portions of the spline body centrally within the kerf. Such allows for flexure of the spline end portions within the kerf to aid the lateral insertion of the spline within the kerf and to provide a resilient support for the teeth 34. Additionally, as the spline teeth 34 are also formed from a thin gauge material there is an increase in their resiliency and therefore in their ability to transmit joint loading without being overstressed. Overloads or shockloads on, or expansion of, the joint may therefore be absorbed without lessening the strength of the joint or the close interfitting coaction between the teeth and the locking edges cut in the sides of the kerf.

Figure 4:
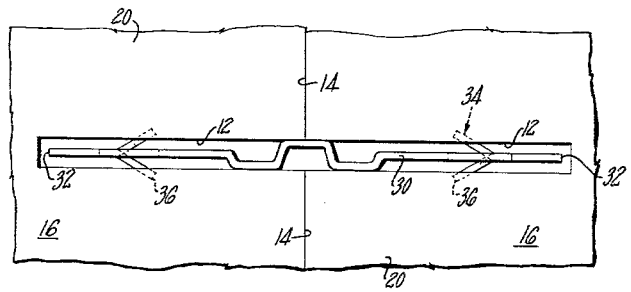
FIG. 4 is a view similar to FIG. 2 of a joint incorporating the fastener of FIG. 3.

In the embodiment of the present invention shown in FIGS. 1 and 2, the central portion of the body of the spline is formed to provide three elongated corrugations extending the length of the spline and providing alternately projecting arcuate lands engageable with opposite sides of the kerf. A similar embodiment of the present invention is shown in FIGS. 3 and 4 wherein the central portion of the spline body is deformed to provide three alternately projecting substantially flat lands engageable with the opposite sides of the kerf. These two embodiments allow for lateral expansion and contraction of the spline, provide for even distribution of the joint loading along the full length of the joint notwithstanding irregularities in the contiguous surfaces 14 of the abutting panel members, allow for misalignment of the opposed kerfs 12 of the abutting panel members, and allow for expansion and contraction of the panel members as due to changes in humidity and temperature without overstressing the joint.

Figure 5:
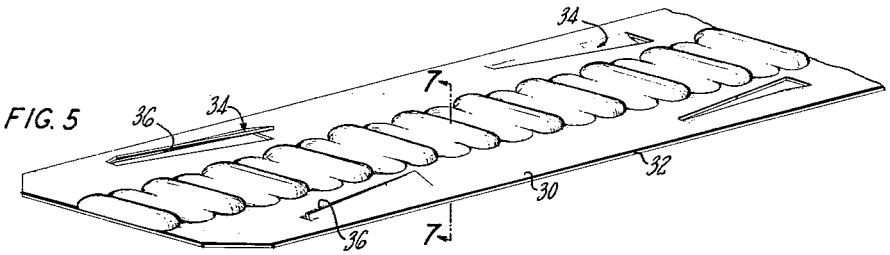
FIG. 5 is an isometric view, partly broken away, of a third embodiment of the fastener of the present invention.
Figure 7:
FIG. 7 is a partial section view taken along the lines 7—7 of FIG. 5.
Figure 6:
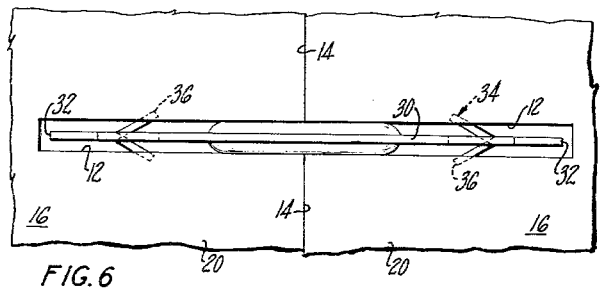
FIG. 6 is a view similar to FIG. 2 of a joint incorporating the fastener of FIG. 5.
Figure 10:
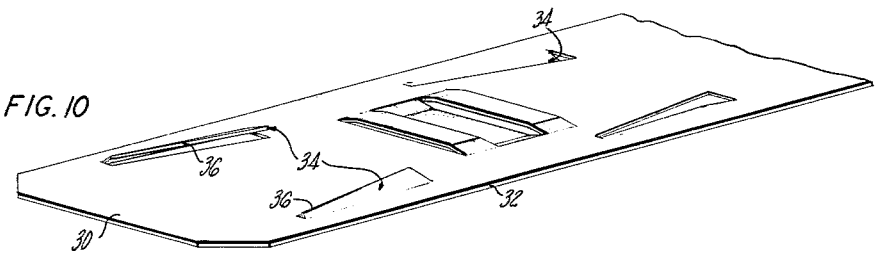
FIG. 10 is an isometric view, partly broken away, of a fifth embodiment of the fastener of the present invention.
Figure 11:
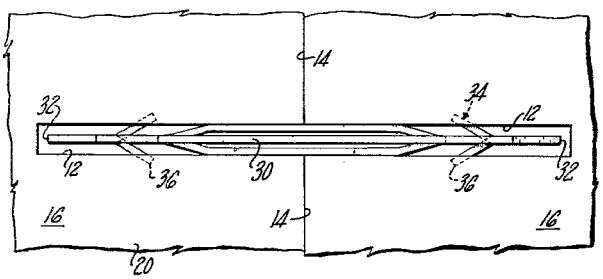
FIG. 11 is a view similar to FIG. 2 of a joint incorporating the fastener of FIG. 10.

The embodiment of the spline of the present invention shown in FIGS. 5, 6 and 7 has its central portion contoured to provide a plurality of laterally extending corrugations. These are preferably formed by upsetting the central portion to define a plurality of oppositely facing cups and alternately projecting arcuate lands engageable with the opposite sides of the kerf. The embodiment of the spline of the present invention shown in FIGS. 10 and 11 is somewhat similar to the embodiment of FIGS. 5, 6 and 7 inasmuch as laterally extending lands are alternately offset from opposite sides of the central portion of the spline body; however, in the embodiment of the FIGS. 10 and 11 the central portion of the spline is longitudinally discontinuous with breaks or openings between adjacent lands. Such provides more resiliency in the central portion of the spline allowing for assembling the spline tightly in the kerf.

Figure 9:
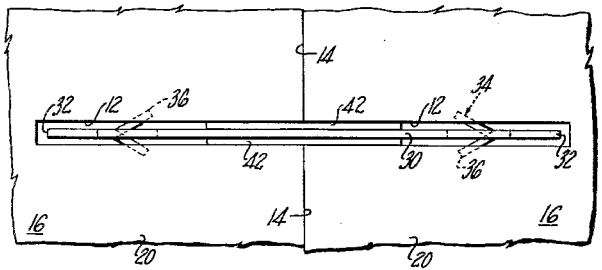
FIG. 9 is a view similar to FIG. 2 of a joint incorporating the fastener of FIG. 8.

In the modification of the spline of FIGS. 8 and 9, elongated pieces 42, preferably of a material similar to the spline body such as steel strapping, are affixed as by welding to opposite sides of the central portion of the spline body thereby substantially increasing the strength of the central portion of the spline.

In all of the modifications of the present invention, the spline fasteners are adapted for being manufactured by a substantially continuous process as by feeding steel strapping into a forming machine, such as a punch press. The splines can thereafter be cut into lengths as required by the particular application. In the case of the embodiment shown in FIGS. 8 and 9, the steel strapping may be first formed to provide the offset cutting edges and thereafter combined with a pair of overlapping narrow lengths of steel strapping which are welded to the spline body by a continuous process.

It can be seen therefore that the spline of the present invention provides substantial economies in the manufacture thereof and in the material used and is readily adapted for joining two parts having opposed slots which are of a width greater than the thickness of the body of the spline. Accordingly, a thin gauge sheet material may be readily used for forming the spline. Additionally, with the spline of the present invention, the spline body has increased strength and rigidity in the longitudinal direction and is nonetheless resilient to allow for transverse flexure thereof and to allow for absorbing shock-loading without destroying the effectiveness or strength of the joint.

As will be apparent to persons skilled in the art various modifications and adaptations of the structure above described will become readily apparent without departure from the spirit and scope of the invention, the scope of which is defined in the appended claims.

I claim:

1. In combination with a pair of members having contiguous surfaces with opposed elongated planar slots of substantially constant width, an elongated sheet metal fastener comprising a fastener body received within the oppositely extending slots including an intermediate portion received in part in each of the slots and a pair of resilient laterally extending flat end portions received in the slots respectively, said intermediate portion being formed to provide an effective thickness substantially equal to the width of the slots and said flat end portions having a thickness less than said effective thickness of the intermediate portion, and a plurality of teeth formed integrally from the resilient end portions thereof defining offset tooth edges inclined to the lateral center line of the fastener and in engagement with the sides of the slots for placing the fastener body under tension and the members in abutting engagement.

2. In combination with a pair of members having contiguous surfaces with opposed elongated planar slots of substantially constant width, an elongated fastener of resilient sheet material comprising a fastener body received within the laterally extending slots including an intermediate portion received in part in each of the slots and a pair of resilient laterally extending end portions received in the slots respectively, said intermediate portion having means providing an effective thickness substantially equal to the width of the slots and said end portions having a thickness less than the effective thickness of the intermediate portion, and a plurality of teeth on the resilient end portions defining offset tooth edges inclined to the lateral center line of the fastener and in engagement with the sides of the slots for placing the fastener body under tension and the members in abutting engagement.

3. The fastener of claim 2 wherein the means providing said effective thickness comprises at least three longitudinally extending corrugations formed in said intermediate portion.

4. The fastener of claim 2 wherein the means providing said effective thickness comprises at least three laterally extending corrugations formed in said intermediate portion.

5. The fastener of claim 2 wherein the means providing said effective thickness comprises at least three alternately projecting longitudinally extending substantially flat lands formed in said intermediate portion.

6. The fastener of claim 2 wherein the means providing said effective thickness comprises at least three alternately projecting laterally extending substantially flat lands formed in said intermediate portion, said lands being longitudinally disconnected and laterally connected to the end portions of the fastener body.

7. The fastener of claim 2 wherein the means providing said effective thickness comprises a pair of substantially flat members fixed to opposite sides of said intermediate portion.

References Cited by the Examiner

UNITED STATES PATENTS

| | | | |
|---|---|---|---|
| 1,095,683 | 5/14 | Stamback | 85—11 |
| 1,354,549 | 10/20 | Gilmer | 85—14 |
| 1,663,580 | 3/28 | Andersin | 20—92 |
| 2,170,462 | 8/39 | Putnam | 85—11 |
| 3,065,508 | 11/62 | Pilloid | 20—92 |

JACOB L. NACKENOFF, *Primary Examiner.*

EDWARD C. ALLEN, *Examiner.*